Aug. 20, 1940.   R. D. KNEALE ET AL   2,212,120
METHOD OF ROASTING COFFEE
Filed Nov. 24, 1939   2 Sheets-Sheet 1

INVENTORS
ROBERT D. KNEALE
AND HARRY CANNON
BY
ATTORNEY.

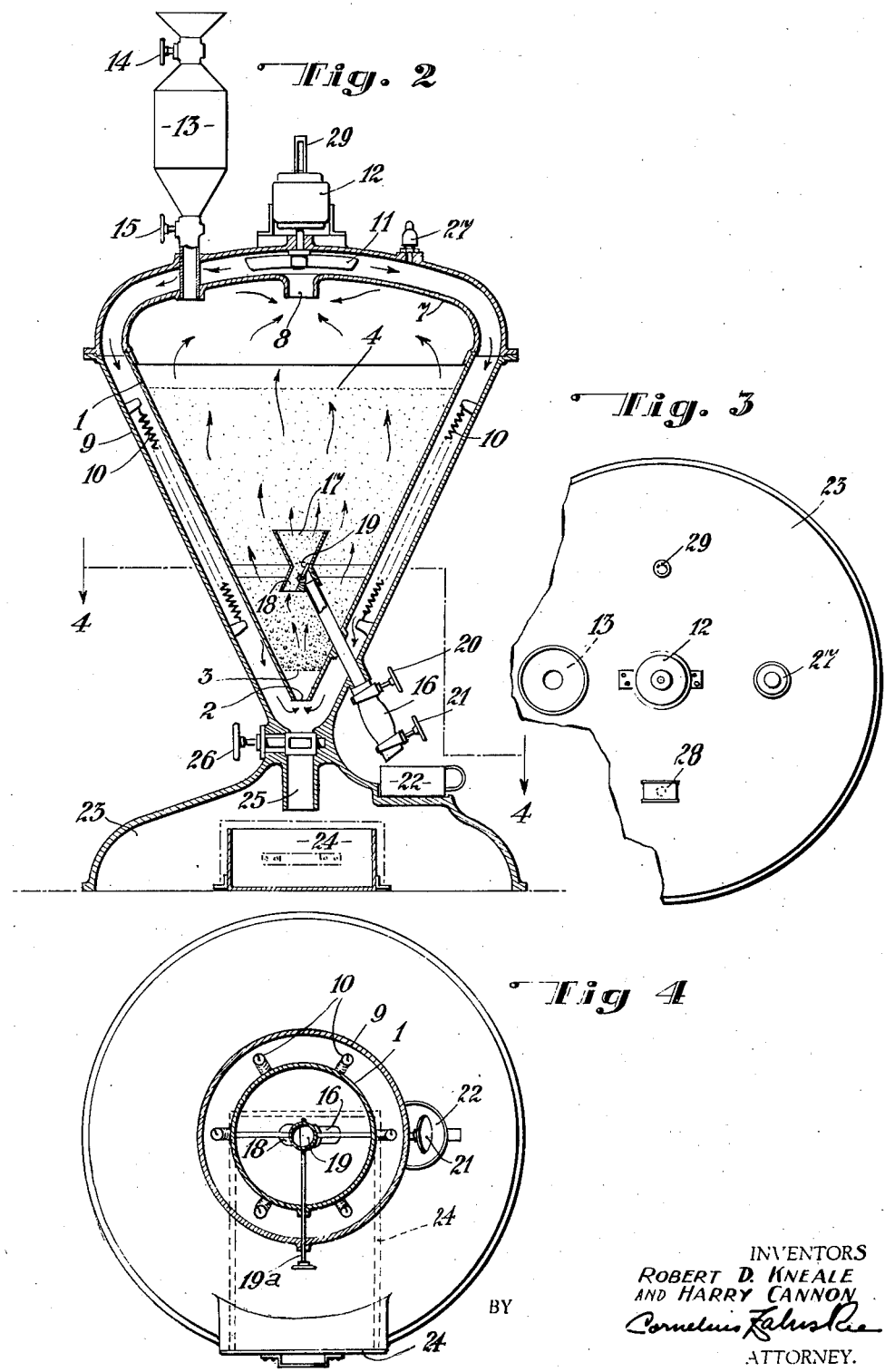

Patented Aug. 20, 1940

2,212,120

UNITED STATES PATENT OFFICE 2,212,120

METHOD OF ROASTING COFFEE

Robert D. Kneale and Harry Cannon,
Atlanta, Ga.

Application November 24, 1939, Serial No. 305,850

2 Claims. (Cl. 99—68)

This invention relates to the art of roasting coffee and while it may be used to advantage in the roasting of coffee in the whole bean, it is particularly directed to the roasting of ground coffee, i. e., coffee resulting from the grinding of the whole beans.

Heretofore coffee beans, either as whole beans or after they have been subdivided or ground, have been roasted by bringing them into contact with heated surfaces or by subjecting them to air or steam heated to a sufficient degree to effect the roasting thereof. In every case, however, so far as we are aware, each and every bean or particle thereof has, during the roasting operation, been subjected to substantially the same heat treatment, i. e., to practically the same amount of heat.

Much difficulty has heretofore attended such roasting operations for no matter whether the bean is roasted whole or after grinding, there is always a very pronounced difference in particle size. For example, it is not uncommon for blends of whole beans to contain some beans three or four times as large as others, while ground coffee beans contain particles which vary in size to such extent that some may be three hundred or five hundred times as large as others.

Our experience in attempting to roast particles of such widely varying size is that the particles of smaller size are burned before the particles of the larger sizes have been sufficiently roasted, or, conversely, a proper heat application to the smaller sizes is wholly insufficient to bring about a satisfactory roasting of the larger particles.

These facts have been heretofore recognized in commercial roasting operations for the treatmeant of the whole bean and attempts have been made to overcome this difficulty by sorting beans before roasting into groups of substantially uniform size, which groups are independently roasted to meet their particular requirements and thereafter blended and ground. This practice is laborious and expensive and while it has been carried out to some extent with the higher priced coffees, it has never been utilized, so far as we are aware, in connection with ground coffee, for the reason that it would be practically impossible to sort the large number of particle sizes for individual roasting.

In the light of the foregoing problem it has long been sought to discover some process or method, whereby coffee particles of various size, whether they be varying sizes of whole beans or particles of ground beans, could be roasted in such manner that each particle would receive sufficient heat to properly roast the same without other particles receiving either too little or too much heat to under-roast or over-roast them.

The object of the present invention is to solve this problem and we have, after long experimentation, succeeded in accomplishing this result, in that we are able, through the employment of a simple, economical method and through the employment of relatively simple and economical apparatus, to roast either whole or ground coffee beans in such a way that all particle sizes of the bean will be uniformly roasted irrespective of their size and in substantially the same time of roasting operation.

The present invention comprises roasting of coffee of assorted particle sizes by enveloping said particles indiscriminately in a moving, substantially cone-shaped column of heated air or other gaseous fluid medium with the axis of the cone substantially vertical and with the air fed at the bottom from the apex of the cone under such conditions of heat and velocity and with the angle at the apex of the cone of such order that said column of air will substantially segregate the particle sizes and decreasing volume into superimposed layers and support the respective particles in these layers throughout the roasting operation, during which the individual particles in each layer will be subjected to graduated heat treatment as the particles become successively smaller, so that, when one group of particles has been properly roasted, all of the particles under treatment will have been correspondingly roasted and all may then be discharged in finished condition.

In practically carrying out the method of this invention, we preferably employ an inverted cone positioned with its axis vertical and with an orifice at the apex of the cone, which is at the bottom thereof. Heated air is forced into the bottom of the cone under sufficient temperature to effect the roasting operation and under sufficient velocity to support, in suspension, coffee particles which may be introduced into the cone, but of insufficient velocity to lift even the lighter particles out of the top of the cone. The requirements for satisfactory operation will be hereinafter more fully explained, but suffice it here to say that the velocities employed are important and must be controlled with respect to the pitch and height of the cone in such a way as to support the coffee against falling through the orifice but not to force the coffee out of the top of the cone. In other words the "floor" of the coffee roasting operation must be above the orifice and the "ceiling" thereof must be below the top of the cone. The heat which may be used is not so critical, although the temperature of such air must be sufficient to roast the coffee. The duration of the roasting operation is controlled to meet the requirements of roasting for air of any particular but adequate temperature.

Features of the invention, other than those adverted to, will be apparent from the hereinafter detailed description and claims, when read in conjunction with the accompanying drawings.

In the accompanying drawings we have diagrammatically shown the method as well as apparatus for carrying out the present invention, but this apparatus is to be understood as illustrative, only, and not as defining the limits of this invention.

In said drawings,

Figure 2 is a vertical section of apparatus for practising the method.

Figure 3 is a plan view of the apparatus of Figure 2.

Figure 4 is a section on the line 4—4 of Figure 2.

Figure 1:
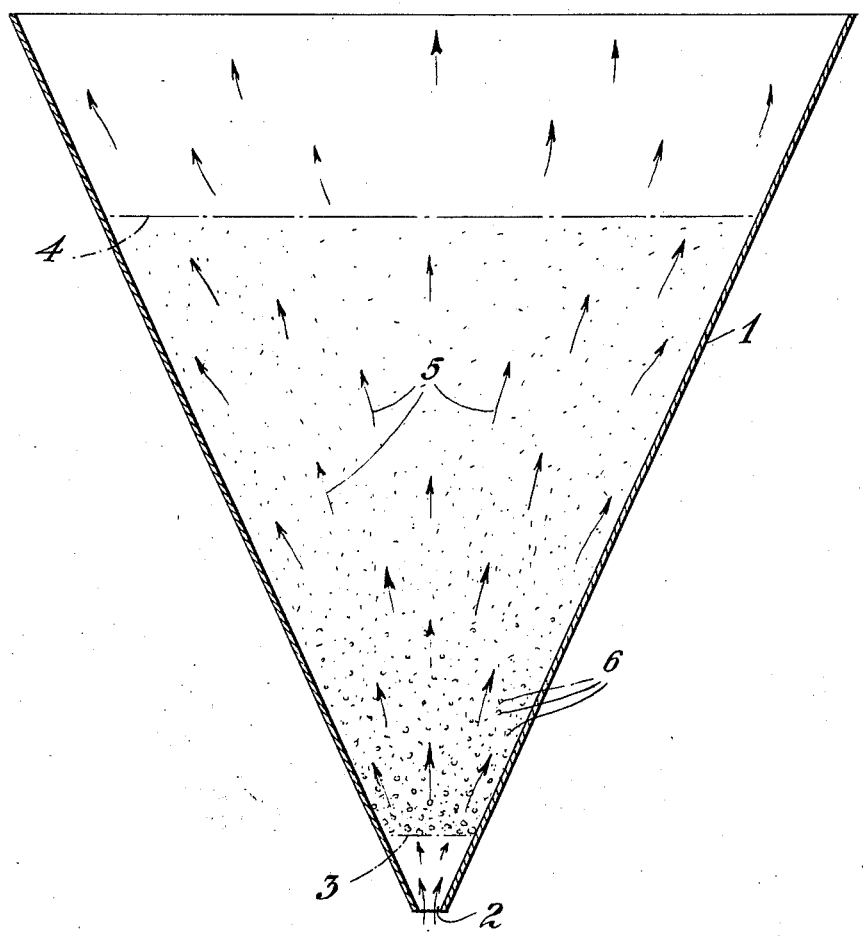
Figure 1 is a diagrammatic showing of the method of this invention.

Figure 1 diagrammatically shows the method. Here, 1 indicates an inverted cone arranged with its apex below and having a vertical axis. The cone is provided at its apex with an orifice 2 through which gaseous medium, such as air, in heated condition, is adapted to be forced. The velocity of this air must be such that coffee particles introduced into the cone will be supported against dropping through the opening at the bottom of the cone to thus establish a pneumatic floor, indicated at 3, in the cone and such velocity must also be such that it will not carry the smaller particles of coffee out of the top of the cone. The ceiling is indicated at 4.

Our experiments have shown that the angle at the apex of the cone is important to a proper operation of the method. This angle can be readily determined by appropriate wind tunnel tests, but we have found that an angle of 70 degrees or less will be operative for our purposes. Highly satisfactory results have been obtained, however, through the use of a cone having an apex angle of 52 degrees. The 52 degrees cone which we used had an altitude of approximately 26" with an orifice at its bottom about 1" in diameter. Air was forced into the orifice 2 at a velocity of about 100 foot per second and, in roasting ground coffee in batches of five pounds and less, the pneumatic floor was established about 2" above the orifice. In this operation we used air at 350° F. and we found that the air passing upwardly through the cone decreased in velocity during its upward progressive passage, with a corresponding decrease in the rate of heat transmission from the air to the coffee particles. We further found that the heavier particles of coffee were near the bottom, while the lighter particles were gradually smaller in the direction of the open top. As the operation proceeded, we took tests from time to time and we found that, when a test showed that particles from any particular portion of the height of the cone had been sufficiently roasted, the particles in the other portion of the cone had also been correspondingly roasted.

In another series of tests, we employed a cone having an apex angle of 55° and an orifice at the bottom of approximately 1". The cone had an altitude of about 3 ft. Air was admitted through the orifice at about 350° F. and at about 150 ft. per second. Ground coffee beans were used and we found that the pneumatic floor was established where the diameter was about 1.3" and that the ceiling was at the substantially 30" diameter. Complete satisfaction was obtained in roasting particles and a uniform roast was obtained within a relatively short time.

In Figure 1 the air stream or column is indicated by the arrows 5, while the individual particles of varying sizes are indicated by the reference character 6. In this view the upward graduation of particle sizes is clearly apparent and the manner in which these particles are individually suspended in the air column will be thoroughly understood from what has been said.

We do not intend to limit the cone to the particular example which we have given as we know that this cone may be changed without destroying the operativeness of the invention. We likewise know that the velocity of air may vary and that its temperature may likewise vary. In any event, however, the velocity of the air must be such as to establish a pneumatic floor within the cone above the lower orifice and also establish a ceiling within the cone and below the top thereof, so that at no time will the particles under treatment be forced out of or evacuated from the cone. Coffee requires a temperature of approximately 300° F. and the temperature should therefore be at least this, although it is preferably somewhat higher, so that the roasting period may not be unduly prolonged.

Our observation was that the heat was applied to the coffee particles in substantially inverse proportion to the size of the particle. That is to say, the heated air, entering through the orifice 2, immediately impinged the largest particles and then passed on to the next smaller particles, and so on, until it left the uppermost or finest particles in the cone. Likewise, as the column of air rose through the cone, its velocity decreased as the distance decreased, because of the angle of the cone, and in this way the particles of various sizes were segregated, roughly speaking, into superimposed layers in suspension and in which layers these particles substantially remained during the entire treatment, to bring about the uniform roasting of all the layers in a relatively short space of time. The results obtained were thoroughly satisfactory for they demonstrated that it was possible to support coffee in the manner stated and uniformly roast the same by an enveloping gaseous roasting medium, the roasting action of which is graduated according to the particular stratum which any particular particle size occupied. Such a result could not possibly be obtained through the use of radiant heat or through contact of particles with a heated surface, because in both of these prior methods, it is impossible to obtain the graduation of heat application according to particle size.

Our ability to obtain the graduated roasting of coffee particles according to their graduations in size is, in our opinion, due to the fact that the rate of rise in temperature decreases as the distance from the orifice of the cone increases, i. e., as the cross sectional area increases and consequently the larger particles are roasted more rapidly than the smaller particles, although the roasting of the unit of mass is substantially uniform and consequently brings about a uniform roast of particle sizes.

Having thus described the method of this in- vention, we will now describe in detail one form of apparatus which we have employed in practising the same and for this purpose attention is now directed to Figures 2–4 inclusive.

In these figures, 1 designates a metal cone provided at its bottom with an orifice 2 and the top of which cone is closed by a wall 7 forming a continuation of the side wall of the cone. This top wall 7 is provided at its center with an air outlet 8. The cone is wholly enclosed within an outer jacket 9 spaced from the exterior of the cone by suitable spacers to leave an air space between the cone and the jacket and in this air space is positioned a plurality of electric heaters 10 suitably insulated from the metal parts of the structure and fed by electric current, in any appropriate manner, so that these heaters, which may conveniently be strip or coil heaters, are free to heat the air within the jacket. Positioned in the axis of the cone and directly above the air outlet 8 is a suction fan 11 driven from a motor 12. The inlet to the fan is juxtaposed to the air outlet 8, while the outlet to the fan is within the jacket, so that air may be drawn by the fan through the outlet 8 and passed to the interior of the jacket to be forced by the fan downwardly around the heating elements 10 in order that the air, after being heated to the desired temperature, may be forced at predetermined velocity through the orifice 2 into the interior of the cone 1. The air velocity and temperature are so controlled as to establish a floor 3 and ceiling 4, as hereinbefore described, and to supply the requisite heat units to the coffee particles to properly roast the same. Coffee is adapted to be admitted into the cone from a supply hopper 13 having double valves 14 and 15, as shown best in Figure 2.

Extending into the interior of the cone is a test tube 16 provided at its inner end with an upstanding hopper 17 positioned substantially centrally of the cone and at the base of which is a return chute 18. A butterfly valve 19 mounted on a valve stem 19a, controls the disposition of the material particles which fall into the hopper 17. Under normal conditions the butterfly valve will direct such particles into the chute 18, but the upward flowing current of air will keep this chute and the hopper substantially free of particles. When a test, however, is desired, the butterfly valve is moved into a position to close the chute 18, so that particles falling into the hopper 17 will fall through the test pipe 16 which is preferably valved at 20 and 21 and a quantity of these particles can be thus drawn off into a test cup 22 and examined to see whether the roasting has proceeded as far as desired.

The whole structure is supported upon a hollow base 23 provided therein with a drawer 24 and directly above the drawer is a discharge pipe 25 having therein a valve 26.

When the coffee is sufficiently roasted, the motor 12 is shut off and the valve 26 opened to discharge the roasted coffee into the drawer 24, so that it may be removed through the side of the base.

Extending from the top of the jacket is a pipe 27 with which is associated a safety valve, so that the pressures which may be generated through heating the air in the apparatus may not become excessive and a pressure gauge 28 is provided so that the pressure in the apparatus can be ascertained at any time. A thermometer 29 extends through the top of the jacket preferably into the cone, so that the temperature therein can be ascertained at all times and, if desired, an additional thermometer may extend into the jacket to determine temperatures therein. The outer wall of the jacket may, if desired, be covered with asbestos or other insulating material to economize in heat and suitable electric connections are provided, not shown, to feed the electric heaters.

The advantage of this structure is that it is extremely simple and compact. The air employed is used over and over in a closed circulatory system within a closed casing and this is conducive to marked economy in heating current consumption. The heating elements are of course free from contact with the walls of the cone, so that if the particles of coffee interior of the cone contact with the walls thereof, they will not be burned or unduly heated by such contact for all the heat applied to these particles is supplied by enveloping them in the heated air. This structure therefore does not in any sense depend upon the roasting of coffee by radiant energy derived from a flame or burner, but rather upon the roasting function of air heated to the necessary temperature to accomplish this result.

In practice, the floor and ceiling to which I have referred are not constant. They both fluctuate slightly because of the cushioning effect of the air. The particles of coffee are in constant state of agitation and bob about in the current of air in which they are wholly enveloped. Nevertheless there is a perceptible graduation of the particles so that the heavier particles are below and the lighter particles above. The air velocity, however, is maintained such that the particles will not fall through the bottom orifice nor will they be thrown up against the top of the apparatus but will, at all times, be maintained in a state of suspension within the cone, until the roasting operation is completed. When this takes place, the circulation of air ceases, the discharge valve is opened and the roasted coffee is discharged at once.

In practice, we generally interlock the circuit to the heater and the circuit to the motor 12, so that the heaters will be turned off when the motor is turned off. This will preclude overheating of the parts at any time. The temperature of the heaters may, moreover, be thermostatically controlled, so that they will be energized as required to produce a substantially constant temperautre of the air circulated in the apparatus.

We have particularly referred to air as the roasting medium, but we may, if desired, employ inert gases for this purpose, either with or without air in carrying out the method of this invention. We particularly call attention to the fact that the apparatus described produces a closed circulatory system, and this system may be under pressure resulting from heating of the air or otherwise, so as to minimize losses of the aromatic principles of the coffee bean. None of these can escape and thus the flavor of the coffee is not impaired by roasting in the manner described.

In the foregoing description and in the appended claims we have referred to the use of an upwardly moving column of air of inverted conical form. We are aware, however, that this column of air, or the casing, need not be in the form of a true cone and therefore wish the invention to be construed in this light. In other words the invention is to be construed to cover a column of air capable of carrying out the method as herein described and not necessarily limited to the straight sided cone or bowl specifically shown in the drawings for the purpose of illustration. In some instances we have varied the shape of this bowl in the direction of parabolical or elliptical vertical cross sections and have obtained passable results, although it has been our experience that the substantially true cone gives the best results.

The foregoing detailed description of the apparatus sets forth the structure which we prefer to employ, but this structure, as well as the method described, is susceptible to variation within the terms of the appended claims and the invention is to be construed as fully commensurate with these claims.

In accordance with this invention, the method and apparatus have been described as so constituted that none of the particles of coffee will be elevated above the ceiling 4. This result is insured in practice by employing a cone of sufficient axial dimension to so function. We are aware, however, that substantially satisfactory performance may be obtained even if a ceiling is provided so close to the top of the cone that some minute particles or dust of the ground coffee are drawn upwardly through the fan and circulated with the air in which they thus become entrained back to the inlet orifice 2. This small amount of minute particles would, however, be so negligible as not to noticeably affect the product and substantial performance of this invention would still be obtained. The present invention does not, therefore, exclude any such attempted colorable evasion.

Having thus fully described the invention, what we claim as new and desire to secure by Letters Patent is:

1. The method of roasting coffee, which comprises suspending coffee particles of different sizes in an upwardly moving column of a gaseous medium of inverted, substantially conical form, feeding such gaseous medium from the apex of the cone at such velocity as to maintain the coffee particles in suspension therein but of insufficient velocity to discharge them from the cone at any time, and heating said gaseous medium, prior to feeding it from the apex of the cone, to a temperature sufficient to roast the coffee thus held in suspension by imparting to the coffee heat treatment graduated inversely to the size of the coffee particles.

2. The method of roasting coffee, which comprises establishing an upwardly moving column of gaseous medium of inverted, substantially conical form, introducing coffee particles of different sizes into said cone of gaseous medium, maintaining said moving column of gaseous medium at sufficient velocity to keep the coffee particles suspended therein at different elevations according to size but of insufficient velocity to discharge them from the cone at any time, collecting the gaseous medium at the top of the cone, and re-introducing it into the cone at the apex thereof to produce a closed circulation cycle of such gaseous medium, and heating such gaseous medium after it has left the zone of coffee particles and before it is introduced into the apex of the cone to a temperature sufficient to roast the coffee thus held in suspension by imparting to such coffee heat treatment graduated inversely to the size of the coffee particles.

ROBERT D. KNEALE.
HARRY CANNON.